United States Patent
Wilber et al.

(10) Patent No.: US 6,894,731 B2
(45) Date of Patent: May 17, 2005

(54) RASTER DISTORTION CORRECTION ARRANGEMENT

(75) Inventors: James Albert Wilber, Indianapolis, IN (US); Peter Ronald Knight, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 525 days.

(21) Appl. No.: 10/183,725

(22) Filed: Jun. 25, 2002

(65) Prior Publication Data

US 2003/0043305 A1 Mar. 6, 2003

Related U.S. Application Data

(60) Provisional application No. 60/316,245, filed on Aug. 31, 2001.

(51) Int. Cl.[7] .................................................. H04N 3/22
(52) U.S. Cl. ...................................... 348/806; 315/371
(58) Field of Search ................................. 348/189, 805, 348/806, 745, 746; 315/370, 371, 387; 345/213

(56) References Cited

U.S. PATENT DOCUMENTS

| 4,184,104 A | | 1/1980 | Shouse, Jr. |
| 4,206,388 A | | 6/1980 | Ishigaki et al. |
| 4,242,714 A | | 12/1980 | Yoshida et al. |
| 4,352,047 A | * | 9/1982 | Imayasu et al. ............ 315/370 |
| 4,584,503 A | | 4/1986 | Pan |
| 4,651,209 A | * | 3/1987 | Okada et al. ............... 348/447 |
| 4,968,919 A | * | 11/1990 | Oliver ........................ 315/371 |
| 5,475,286 A | * | 12/1995 | Jackson et al. ............. 315/371 |
| 5,656,894 A | * | 8/1997 | Murakami et al. .......... 315/371 |
| 5,712,532 A | * | 1/1998 | Ogino et al. ................... 315/1 |
| 6,534,920 B1 | * | 3/2003 | Uwabata et al. ............... 315/1 |
| 2002/0135705 A1 | * | 9/2002 | Nakatsuji et al. ........... 348/806 |

OTHER PUBLICATIONS

Data Sheet TDA4841PS I2C–bus autosync deflection controller for PC monitors, Philips Semiconductor 1999 Oct. 25, 1999.

* cited by examiner

Primary Examiner—Victor R. Kostak
(74) Attorney, Agent, or Firm—Joseph S. Tripoli; Harvey D. Fried; Christine Johnson

(57) ABSTRACT

Synchronization of a horizontal deflection circuit with horizontal synchronizing signal pulses is obtained by the use of a voltage controlled oscillator (VCO) that is included in a phase-lock loop circuit (PLL). A phase-control loop circuit (PCL) includes a phase detector having a first input terminal that is responsive to an output signal of the VCO and a second input terminal that is responsive to retrace pulses of a horizontal deflection circuit output stage. A sum signal of the phase detector output signal of the PLL and a vertical rate parabola signal is formed upstream of the loop filter of the PLL. Correction of a differential pin distortion is accomplished by dynamically phase shifting the phase of an output signal of the VCO in a vertical rate parabola manner.

6 Claims, 2 Drawing Sheets

RASTER DISTORTION CORRECTION ARRANGEMENT

CROSS REFERENCE TO RELATED APPLICATIONS

This is a non-provisional application which claims the benefit of provisional application Ser. No. 60/316,245 filed Aug. 31, 2001.

BACKGROUND OF THE INVENTION

This invention relates to a deflection synchronizing arrangement of a television apparatus In a television receiver, the electron beams inside the television receiver picture tube are deflected by magnetic fields generated by sawtooth deflection currents flowing in horizontal and vertical deflection windings. The deflected electron beams scan a raster pattern on the picture tube phosphor screen. The raster pattern, without correction, may display various geometric distortions such as side or east-west pincushion distortion. To provide side or East-West (E-W) pincushion distortion correction or E-W pin distortion correction, the peak-to-peak horizontal deflection trace current in the horizontal deflection winding is modulated at a vertical rate in a parabolic manner, for example, by using a diode modulator.

FIG. 1a illustrates the raster pattern of a pair of vertical curved lines, 300 and 301, that are ideally straight, displayed on a large size cathode ray tube (CRT) having a flat screen with uncorrected differential pin distortion and uncorrected pin distortion. Without correction, the raster pattern of vertical line 300 at the extreme left of a CRT screen 304 will have a different amount of east-west pincushion distortion than vertical curved line 301 at the extreme right of CRT screen 304. As manifested by distance parameters d300 and d301, a larger amount of pincushion distortion appears at the left, or start of scan edge, than at the right of the screen. Such distortion is referred to herein as a differential pin distortion.

The large vertical rate modulation of horizontal deflection current required for E-W pin distortion correction on a flat CRT can interact with the linearity coil in such a way as to result in an increased differential pin. When differential pin distortion exists, the diode modulator, by itself, may not be capable of fully correcting such distortion because the diode modulator operates symmetrically with respect to a vertical line 310 at the screen center.

In order to synchronize the scanning of the beam with the display video information, the horizontal drive signal of the horizontal deflection circuit output stage is synchronized with a stable horizontal synchronizing signal contained in a composite video signal. When transmitted, the synchronizing signal pulses recur at, for example, 15,625 Hz that is stable. However, when received, the synchronizing signal may no longer be stable and may contain distortions in the form of signal noise. Because of the presence of noise, synchronization of the horizontal deflection circuit with the horizontal synchronizing signal pulses is obtained in a well known manner by the use of a voltage controlled oscillator (VCO) that is included in a phase-lock loop circuit (PLL). The VCO generates a signal at a frequency that is equal to, for example, a high multiple of the frequency of the synchronizing signal. The VCO generated signal is frequency divided down in a frequency divider and an output signal approximately equal to the horizontal frequency is generated. The frequency divider output signal and the synchronizing signal are coupled to a phase detector having an output signal that is coupled to a loop filter having a relatively long time constant. An output signal of the filter is coupled to a frequency/phase control terminal of the VCO for controlling the frequency/phase of the VCO output signal.

When a synchronizing pulse is obscured by noise, the rate of the VCO, nevertheless, remains substantially unchanged by the PLL operation and the deflection circuit continues to receive regular deflection control pulses. A frequency divider arrangement produces from the output signal of the VCO a horizontal-rate output signal with high stability. The horizontal rate output signal may be phase locked by the PLL to the average phase of the incoming synchronizing signal.

The timings of a deflection current in a deflection winding and of the retrace pulses produced by the horizontal deflection circuit output stage may vary in a manner dependent upon various factors such as transient loads on the flyback transformer due to audio or video transients, which in turn modulate the turnoff time of the horizontal output transistor. This variation in the timings of the horizontal retrace pulses, disadvantageously, may cause a distortion of the displayed image. To prevent the occurrence of a variation in a delay of the deflection current relative to the synchronizing signal, it is known to utilize additionally a phase-control loop circuit (PCL) to form a dual feedback loop arrangement.

The PCL includes a second phase detector having a first input terminal that is responsive to an output signal of the VCO of the PLL and a second input terminal that is responsive to retrace pulses produced in the horizontal deflection circuit output stage. The second phase detector produces a phase difference indicative signal that is coupled to a loop filter of the PCL. A controllable phase shifter is responsive to an output signal generated by the PCL loop filter for producing horizontal-rate drive pulses at a dynamically controllable phase shift. Thereby, the horizontal-rate drive pulses are maintained in a constant phase relationship with the output signal of the PLL.

It is known to correct differential pin distortion by phase shifting, in the PCL, the phase of a horizontal drive signal of the horizontal deflection circuit output stage. Thereby, elimination of the left edge pincushion distortion of curved line 300 of FIG. 1a to form straight line 300' FIG. 1b and elimination of right edge pincushion distortion curved line 301 of FIG. 1a to form straight line 301' FIG. 1b is obtained. Consequently, a bow line 310' is obtained instead of straight line 310 of FIG. 1a. Similar symbols and numerals in FIGS. 1a and 1b indicate similar items or functions.

Synchronization of a horizontal deflection circuit with horizontal synchronizing signal pulses is obtained by the use of a VCO that is included in a PLL. A PCL includes a phase detector having a first input terminal that is responsive to an output signal of the VCO and a second input terminal that is responsive to retrace pulses of a horizontal deflection circuit output stage. Correction of differential pin distortion is accomplished by dynamically phase shifting the phase of the output signal of the PLL in a vertical rate parabola manner. A vertical rate parabola signal provides phase shifting of the horizontal drive signal of the horizontal deflection circuit output stage in a vertical rate parabola manner. By phase shifting the phase of the output signal of the PLL, the horizontal drive signal of the PCL is less susceptible to noise than if phase shifting occurs downstream of the PLL loop filter. This is so because the vertical rate parabola signal is inserted upstream of the loop filter of the PLL.

SUMMARY OF THE INVENTION

A video display deflection apparatus, embodying an inventive feature includes a phase-lock-loop circuit. The phase-lock-loop circuit includes an oscillator and a phase detector. The phase detector is responsive to a synchronizing, first signal at a frequency related to a first deflection frequency and to an output signal of the oscillator for controlling a phase of the oscillator output signal, in accordance with a phase of the synchronizing, first signal. A waveform generator generates a periodic raster distortion correction signal at a frequency related to a second deflection frequency coupled to the phase-lock-loop cicuit for periodically varying the phase of the oscillator output signal, in accordance with the raster distortion correction signal. A phase-control-loop circuit is responsive to a feedback signal, generated by a deflection output transistor, and to the oscillator output signal for generating a control signal of the deflection output transistor to control a phase of a deflection current in a deflection winding, in accordance with a phase of the feedback signal.

BRIEF DESCRIPTION OF THE DRAWINGS

FIG. 2 illustrates a phase-lock-loop circuit, embodying the invention, that provides dynamic phase modulation of a horizontal deflection current for correcting the differential pin distortion of FIG. 1a.

DESCRIPTION OF THE PREFERRED EMBODIMENTS

Figure 1A:
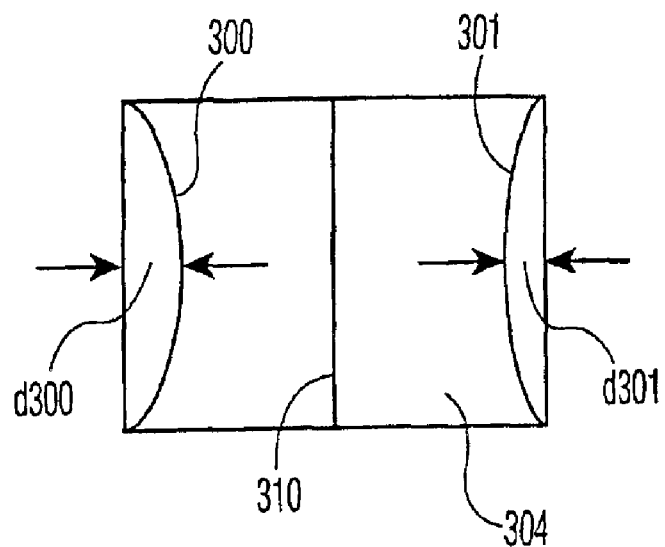
FIG. 1a illustrates the raster pattern of a pair of straight vertical lines displayed on a CRT screen and having uncorrected differential pin distortion and uncorrected pin distortion.
Figure 1B:
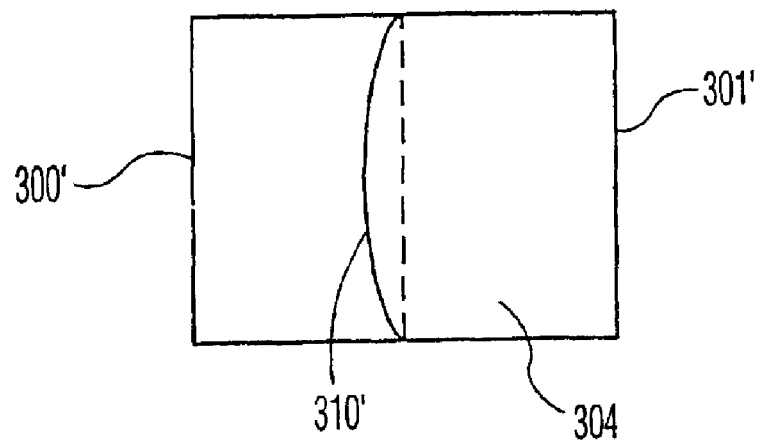
FIG. 1b illustrates the raster pattern of the pair of straight vertical lines, shown in FIG. 1a, after correction of both the pin and differential pin distortions.
Figure 2:
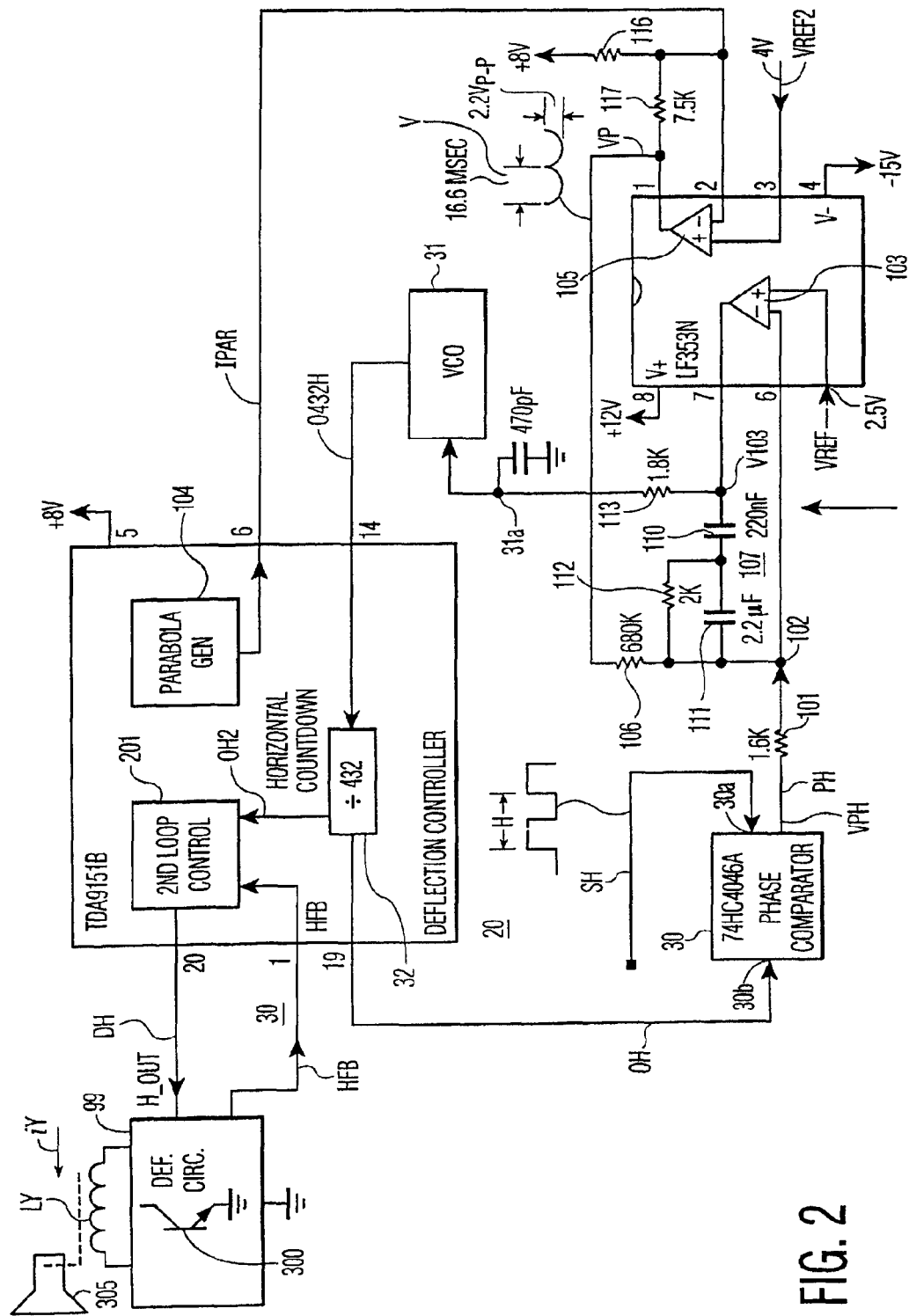

Horizontal sync pulse signal SH of FIG. 2 having a period H of, for example, 31.78 microseconds, and at a corresponding frequency fH of 31,250 Hz is produced in a conventional source, not shown. Horizontal sync pulse signal SH is coupled to an input terminal 30a of a phase detector 30 of a phase-lock-loop circuit (PLL) 20. A signal OH that is, during steady state operation, at the frequency fH is coupled to a second input terminal 30b of phase detector 30. A phase difference indicative signal PH that is indicative of the phase difference between signals SH and OH is generated in phase detector 30.

A parabola generator 104 generates a vertical rate parabola current signal IPAR having a period V of 16.6 milliseconds. Current signal IPAR varies, during period V and has a value that is substantially different, when an electron beam, not shown, is at a top and at a bottom of a display screen of a cathode ray tube (CRT) 305 than at a center. Signal IPAR is direct current (DC) applied via a signal path that includes a buffer amplifier 105 having a feedback resistor 116 for generating a parabola voltage VP at an output terminal, pin1, of amplifier 105. Signal VP is at the low frequency of 60 Hz. Amplifier 105 provides a direct current (DC) level shifting by the operation of a reference voltage VREF2, coupled to a non-inverting input terminal of amplifier 105. Voltage VP is DC-coupled via a current summing resistor 106 to a current summing junction terminal 102. Signal PH is coupled via a current summing resistor 101 to current summing junction terminal 102 forming an inverting input terminal of a summing amplifier 103. Summing amplifier 103 combines signals PH and VP to produce an output signal V103. Summing amplifier 103 also provides DC level shifting by the operation of a reference voltage VREF coupled to a non-inverting input terminal of summing amplifier 103.

A capacitive network 107 is coupled between an output terminal, pin 7, of summing amplifier 103, and terminal 102 to form with amplifier 103 an active loop filter of PLL 20. Network 107 includes a pair of series coupled capacitors 110 and 111 and a resistor 112 that is coupled in parallel with capacitor 111. Output signal V103 of amplifier 103 is DC-coupled via a resistor 113 to a frequency control input terminal 31a of a conventional voltage controlled oscillator (VCO) 31. VCO 31 generates an output signal O432H. Signal O432H is frequency divided by a factor of 432 in a frequency divider 32 to produce signal OH at the frequency fH and a second signal OH2 also at the frequency fH that may be phase shifted relative to signal OH. PLL 20 causes signals OH, and OH2 to be synchronized to signal SH.

Output signal OH2 is coupled to a conventional control circuit 201 that includes a phase detector and a phase shifter, not shown, of a conventional phase-control-loop circuit (PCL) 30. PCL 30 generates a drive signal DH at the frequency fH. Signal DH is coupled via a horizontal driver, not shown, to a base electrode of a switching output transistor 300 included in a conventional horizontal deflection circuit 99. Horizontal deflection circuit 99 produces in a winding of a flyback transformer, not shown, a retrace pulse voltage HFB, in a conventional manner. PCL 30 is synchronized to signal OH, in a conventional manner, such that a deflection current iY in a horizontal deflection winding LY is maintained in a constant phase relationship relative to signal OH. Current iY generates a horizontal deflection field in CRT 305.

To provide side pincushion distortion correction or E-W pin correction, the peak-to-peak horizontal deflection trace current iY in horizontal deflection winding LY is modulated at a vertical rate in a parabolic manner, for example, by using a diode modulator, not shown, in horizontal deflection circuit 99. Signal IPAR of parabola generator 104 may also be used for controlling such diode modulator, not shown, in a conventional manner.

Correction of differential pin distortion is accomplished by phase shifting the phase of signal OH2 of PLL 20. Consequently, the phase of each of signal DH and of deflection current iY is dynamically shifted from a given horizontal deflection period H to the next one in a vertical rate parabola manner in accordance with parabola voltage VP or current IPAR. The phase shifting operation adds center-line bow in a direction to reduce left edge pincushion and increase right edge pincushion.

In carrying out an inventive feature, vertical rate parabola signal VP and phase difference indicative signal PH are summed upstream of the loop filter function provided by amplifier 103. Advantageously, applying parabola voltage VP via filter network 107 of PLL 20 increases the noise immunity with respect to any noise component that might be included in parabola voltage VP.

As explained before, voltage VP or current IPAR is DC-coupled to VCO 31. Because of the DC-coupling, there is no need to employ a large DC blocking capacitor for applying low frequency signal VP to terminal 31a of VCO 31. For frequencies small with respect to the loop bandwidth, PLL 30 causes the following condition to be met: $K_{PD}*\Phi/$(the value of resistor 101)+VP/(the value of resistor 106)=0, where $K_{PD}$ is the phase detector gain in volts per radian and $\Phi$ is the phase lag of signal OH with respect to sync signal SH. Thus, $\Phi=-$(VP/(the value of resistor 106))*(the value of resistor 101)/$K_{PD}$. Because the required bow correction is very small with respect to a horizontal period and the parabola DC voltage is less than the parabola peak-to-peak amplitude, the static phase error resulting from DC coupling is, advantageously, sufficiently small to be acceptable.

What is claimed is:

1. A video display deflection apparatus, comprising:
    a phase-lock-loop circuit including an oscillator and a phase detector, said phase detector being responsive to a synchronizing, first signal at a frequency related to a first deflection frequency and to an output signal of said oscillator for controlling a phase of said oscillator output signal, in accordance with a phase of said synchronizing, first signal;
    a waveform generator for generating a periodic raster distortion correction signal at a frequency related to a second deflection frequency coupled to said phase-lock-loop circuit for periodically varying said phase of said oscillator output signal, in accordance with said raster distortion correction signal; and
    a phase-control-loop circuit responsive to a feedback signal, generated by a deflection output transistor, and to said oscillator output signal for generating a control signal of said deflection output transistor to control a phase of a deflection current in a deflection winding, in accordance with a phase of said feedback signal.

2. A video display deflection apparatus according to claim 1 wherein said periodic raster distortion correction signal has a parabola waveform for correcting differential pin distortion.

3. A video display deflection apparatus according to claim 1 wherein said phase detector is coupled via a low-pass filter to a phase control input of said oscillator and wherein said raster distortion correction signal is coupled via said low-pass filter to said phase control input of said oscillator to form a direct current signal path between said phase detector and said oscillator.

4. A video display deflection apparatus according to claim 1 wherein said phase detector and said source of said raster distortion correction signal are coupled via corresponding current summing resistors to an input of said low-pass filter.

5. A video display deflection apparatus according to claim 1 wherein said raster distortion correction signal is coupled via a low-pass filter to a phase control input of said oscillator.

6. A video display deflection apparatus according to claim 1 wherein said deflection current is at a horizontal deflection frequency and said raster distortion correction signal is at a vertical deflection frequency.

* * * * *